United States Patent
Trainer et al.

(10) Patent No.: US 7,554,301 B2
(45) Date of Patent: Jun. 30, 2009

(54) FAULT CURRENT LIMITING IN AN ELECTRICAL POWER NETWORK

(75) Inventors: David R Trainer, Derby (GB); John J A Cullen, Derby (GB); John R Smith, Stonehaven (GB)

(73) Assignee: Rolls-Royce plc, London (GB)

( * ) Notice: Subject to any disclaimer, the term of this patent is extended or adjusted under 35 U.S.C. 154(b) by 226 days.

(21) Appl. No.: 11/702,105

(22) Filed: Feb. 5, 2007

(65) Prior Publication Data
US 2007/0200535 A1    Aug. 30, 2007

(51) Int. Cl.
*H02J 7/14* (2006.01)
*G01R 31/34* (2006.01)

(52) U.S. Cl. .............................. 322/37; 322/25; 322/59
(58) Field of Classification Search ................... 322/22, 322/23, 24, 25, 36, 37, 59, 99; 361/20, 29, 361/87; 324/510, 772
See application file for complete search history.

(56) References Cited

U.S. PATENT DOCUMENTS

| | | | |
|---|---|---|---|
| 3,713,016 A | 1/1973 | Lehnhoff | |
| 4,155,107 A * | 5/1979 | Osborne et al. | 361/20 |
| 4,379,990 A * | 4/1983 | Sievers et al. | 322/99 |
| 4,446,417 A | 5/1984 | Fox | |
| 4,623,949 A * | 11/1986 | Salowe et al. | 361/63 |
| 4,710,840 A * | 12/1987 | Shepler et al. | 361/20 |
| 4,933,630 A * | 6/1990 | Dupraz | 324/107 |
| 5,206,776 A | 4/1993 | Bodenheimer | |
| 5,583,420 A * | 12/1996 | Rice et al. | 322/25 |
| 5,764,462 A * | 6/1998 | Tanaka et al. | 361/42 |
| 6,031,701 A | 2/2000 | Maeckel | |
| 6,191,562 B1 | 2/2001 | Mueller | |
| 6,940,702 B2 * | 9/2005 | Kojovic et al. | 361/62 |
| 7,253,634 B1 * | 8/2007 | Kasztenny et al. | 324/510 |
| 2004/0061482 A1 | 4/2004 | Taniguchi | |

FOREIGN PATENT DOCUMENTS

GB    2 293 704 A    4/1996

* cited by examiner

*Primary Examiner*—Nicholas Ponomarenko
(74) *Attorney, Agent, or Firm*—W. Warren Taltavull; Manelli Denison & Selter PLLC

(57) ABSTRACT

Generators 12a are for a distributed generation system. A control system 32a receives information about network faults 14a. In normal conditions, the control system 32a controls the field current in the field coils of the generator 12a, to maintain generator output voltage at the rated value. At the onset of fault conditions, the control system 32a changes the manner in which field current is controlled, in order to reduce the fault current put onto the network.

24 Claims, 4 Drawing Sheets

PRIOR ART

FAULT CURRENT LIMITING IN AN ELECTRICAL POWER NETWORK

FIELD OF THE INVENTION

The present invention relates to fault current limiting. In particular, the invention concerns fault currents within electrical generator arrangements.

BACKGROUND OF THE INVENTION

There is increasing interest in implementing electrical power networks by connecting power generators at various positions around the network to create a distributed generation system. This provides a number of advantages, but has the disadvantage of increasing the fault level of the network. This may result in allowable limits for equipment within the network being eventually exceeded, or requiring cables, switchgear and associated protection hardware to be upgraded to increase the allowable limits to accommodate the increased fault levels. This may be expensive or, in the case of an established network, unacceptable for other reasons.

SUMMARY OF THE INVENTION

The present invention provides an electrical generator arrangement for an electrical power network, comprising:

a field coil arrangement which, in use, creates magnetic flux within the generator arrangement;

field current supply means, operable, in use, to control the field current in the field coil arrangement;

and monitor means operable to monitor network conditions to detect the onset of fault conditions; the field current supply means being responsive, in use, to the onset of fault conditions to reduce the generated current to the network, by control of the field current.

The field current supply means is preferably responsive to the onset of fault conditions to reduce the magnitude of the field current. The field current supply means may reduce the generated current by connecting together the terminals of the field coil arrangement, to cause the magnetic flux to decay. The field current supply means may short together the terminals. Alternatively, the field current supply means may reverse the polarity of the control voltage supplied to the field coil arrangement.

The field current supply means may include a power electronic converter operable to control the field current. The power electronic converter may include a first diode device connected in parallel with the field coil, to be reversed biased relative to the field current, and first switch means operable to disconnect a common terminal of the field coil and the diode device, from the field current supply, whereby the common terminal is disconnected from the field current supply by opening the switch, allowing field current to re-circulate to the field coil, through the diode device.

Alternatively, the power electronic converter may include first and second switch means connected between respective first and second terminals of the field coil arrangement, and respective sides of the field current supply means, and further include first and second diode devices connected, respectively, between the supply side of the first switch and the second terminal of the coil, and between the supply side of the second switch and the first terminal of the coil, whereby the control voltage applied to the field coil arrangement is reversed by opening both switch means.

The monitor means may detect the onset of fault conditions by reference to network current, network voltage, generator output current or generator output voltage. The monitor means may detect the onset of fault conditions in a predictive manner.

The monitor means may detect the onset of fault conditions as a reduction in network voltage, such as a reduction by more than a threshold amount.

The field current supply means preferably operates, in use, in the absence of fault conditions, to maintain the output voltage of the generator arrangement.

In another aspect, the invention provides field current supply means of the electrical generator arrangement of any of the preceding definitions.

In a further aspect, the invention provides a method of electrical generation for an electrical power network, in which a field coil arrangement is used to create magnetic flux within a generator arrangement, network conditions are monitored to detect the onset of fault conditions, and the field current is controlled in response to the onset of fault conditions to reduce the generated current to the network.

The field current may be reduced in response to the onset of fault conditions. The terminals of the field coil arrangement may be connected together to cause the field to decay, thereby reducing the magnitude of the field current. The terminals may be shorted. Alternatively, the polarity of the control voltage applied to the field coil arrangement may be reversed in response to the onset of fault conditions.

The onset of fault conditions may be detected by reference to network current, network voltage or in a predictive manner. The onset of fault conditions may be detected as a reduction in network voltage, preferably as a reduction by more than a threshold amount.

BRIEF DESCRIPTION OF THE DRAWINGS

Examples of the present invention will now be described in more detail, by way of example only, and with reference to the accompanying drawings, in which.

DETAILED DESCRIPTION OF THE INVENTION

Figure 1:
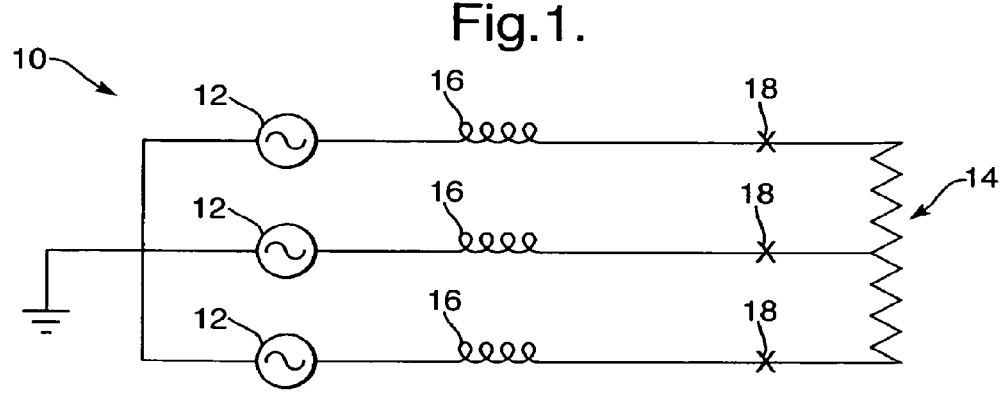
FIG. 1 is a schematic diagram of a distributed electrical generation arrangement of conventional form, in fault conditions.

FIG. 1 illustrates an electrical power network 10 supplied by generators 12 connected at appropriate points around the network, creating a distributed generation system. Fault conditions are illustrated in FIG. 1 by a fault at 14, having the result of shorting the network. The network 10 will have an impedance between each generator 12 and the fault 14, indicated in FIG. 1 by an impedance 16.

Each generator 12 will include control systems which seek to maintain the output voltage of the particular generator at the rated voltage. Accordingly, in the event of a fault 14 shorting the network 10, each generator 12 will tend to increase its output current in an attempt to maintain the output voltage at the rated value. This results in increased current flowing over the network 10.

Switchgear, illustrated schematically at 18, is conventionally provided at various locations around the network, to isolate a fault 14. Any switchgear 18 will require a period of time for reaction (typically between 160 ms and 200 ms), by which time the network current may have risen significantly, as noted above. The level of this additional current, termed the fault current, should not be above the rated capacity of the switchgear 18, termed the fault level of the network 10, if the switchgear 18 is to operate correctly. However, increasing the number of generators 12 tends to increase fault levels required on the network by increasing fault currents, with the result that the required fault level may exceed the rated levels of the switchgear 18, so that it becomes necessary to upgrade or replace the switchgear 18 to allow a higher fault level.

Figure 2:
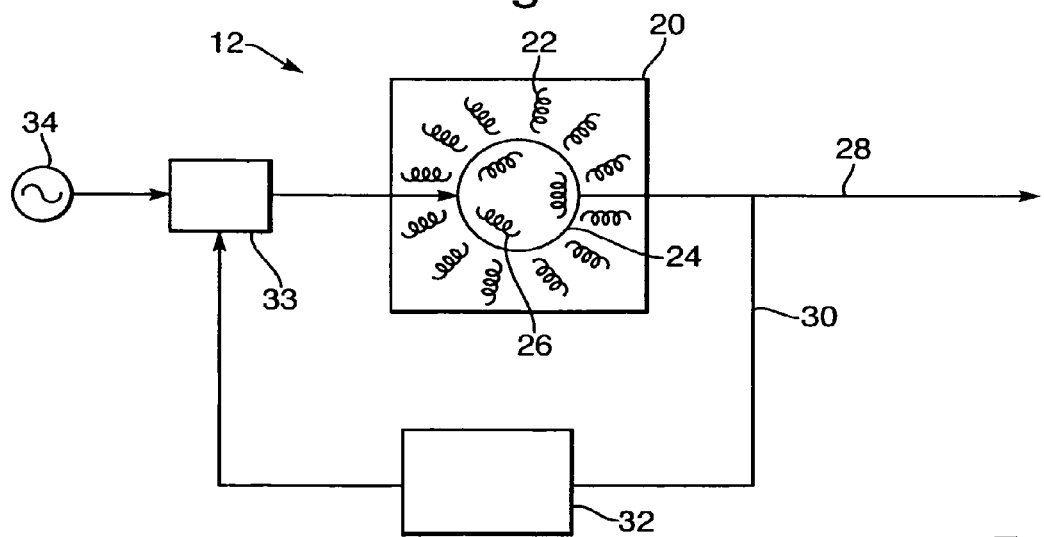
FIG. 2 is a highly simplified schematic diagram of a typical generator for use in the arrangement of FIG. 1.

FIG. 2 illustrates one of the generators 12 of FIG. 1. The generator 12 includes a stator 20 including a ring of stator coils 22 around a rotor 24, which has one or more field current coils illustrated schematically at 26. The field current coils 26 create magnetic flux within the generator 12, which interacts with the stator coils 22 to produce an output EMF at the generator terminal 28. A single terminal 28 is illustrated in FIG. 2, for simplicity; generator machines are conventionally wound to create a three phase EMF output.

The generator output at 28, usually the voltage level, is monitored at 30 by a control system 32. The control system 32 controls a current supply 33 which supplies the field current to the coil 26, commonly by rectification of an AC supply 34, which may be drawn from the network being supplied by the generator 12. The control system 32 acts in response to the output voltage at 30 to change the current supplied to the field coil 26 in order to maintain the output voltage at 28. It is this function of maintaining the voltage which results in fault current being generated in the event of fault conditions, as described above.

Figure 3:
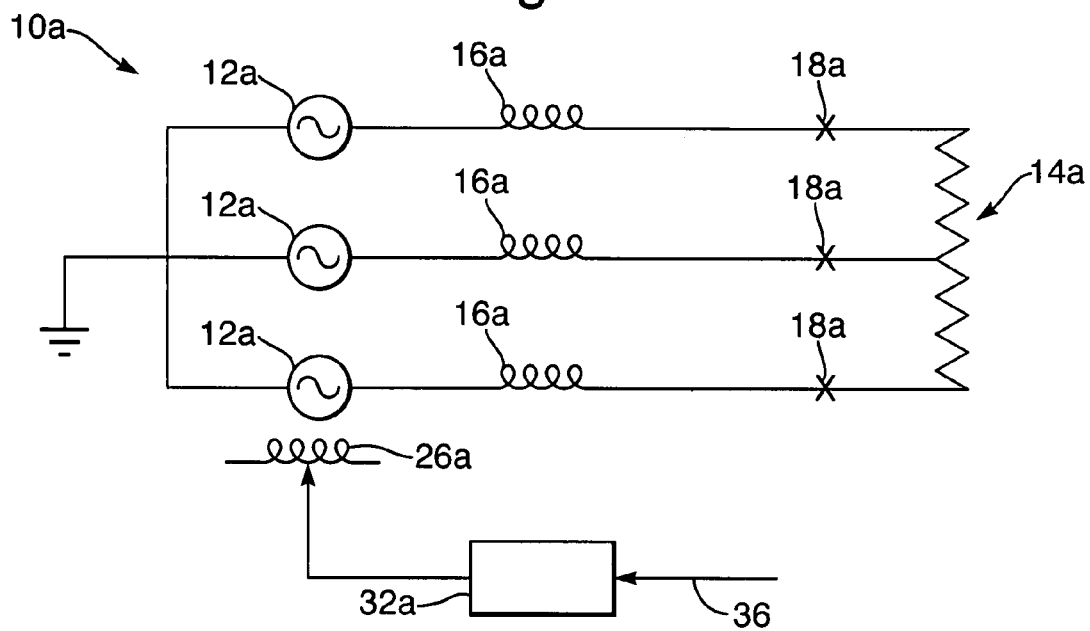
FIGS. 3 and 4 correspond with FIGS. 1 and 2, after modification in accordance with the invention.

FIG. 3 illustrates the arrangement of FIG. 1, modified in accordance with an example of the present invention. Many features correspond with those of FIG. 1 and are therefore given the same reference numeral, with the suffix a, b etc.

In the example arrangement of FIG. 3, the current in the field coils 26a is controlled by a control system 32a which in turn receives information about the onset of fault conditions, at 36. Other control arrangements, such as those described above, can be provided for maintaining the generator output voltage during normal conditions, in the manner described, or those functions may be incorporated within the control system 32a, which accordingly acts in the manner described, prior to the onset of fault conditions.

In this example embodiment, the control system 32a serves to change the manner in which the field current to the coils 26a is controlled, when the onset of fault conditions has been detected. Specifically, the control system 32a is responsive, in use, to the onset of fault conditions to reduce the generated current to the network 10a by control of the field current.

Figure 4:
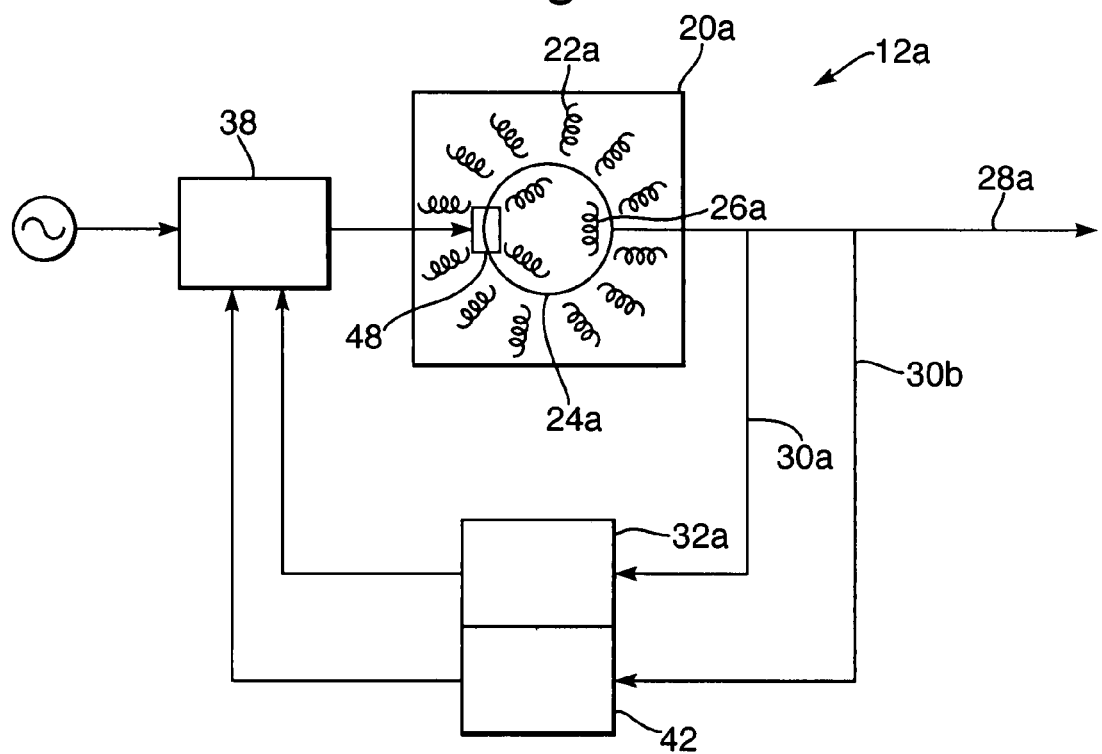

This is illustrated in more detail in FIG. 4, which illustrates a system similar to that of FIG. 2, modified in accordance with the invention. Many features correspond with those of FIG. 2 and are used again in relation to FIG. 4, with a suffix a.

In FIG. 4, field current is supplied to the coils 26a of the rotor 24a from a field current supply at 38. Varying the field current to the rotor 24a varies the output voltage supplied to the network at 28a.

The output at 28a is monitored by two feedback loops, illustrated in this manner to emphasize that one loop is used prior to the onset of fault conditions, and the other loop is used once the onset of fault conditions has been detected, as follows.

Prior to the onset of fault conditions, the output monitored at 30a is used by the field current control function 32a to control the field current supply 38 in order to maintain the rated output voltage at the terminal 28a. Typically, a reduction in the voltage at the terminal 28a will be compensated by an increase in field current, to increase the magnetic flux and thereby restore the EMF at the generator output.

When the onset of fault conditions is detected, for example when the output voltage monitored at 30b has dropped by more than a threshold amount (such as 5%), a fault current limiting function 42 takes over from the field current control function 32a. This controls the field current supply 38 so that the field current is controlled in such a way as to reduce the current supplied to the network at 28a.

Accordingly, it can be seen that the nature of the feedback control of the field current supply 38 changes when the onset of fault conditions is detected. Accordingly, two independent feedback loops could be used, with the appropriate loop being operated according to the prevailing fault or normal conditions. Alternatively, and preferably, a single system is used, operating according to a first algorithm for normal conditions, or an alternative algorithm for use after the onset of fault conditions. Thus, it is expected that the control system 32a, 42 can readily be implemented by means of a microprocessor or equivalent device which recognises the onset of fault conditions and changes its field current control algorithm in response.

A number of different responses to the onset of fault conditions can be envisaged. One is to reduce the magnitude of the field current, thereby reducing the fault current supplied from the generator 12a to the network 10a. Other examples may require the provision of a control device at the rotor 24a, such as a power electronic converter 48 controlled by appropriate inputs from the field current supply 38. For example, the response to the onset of fault conditions may be for the power electronic controller to connect together the terminals of the field coils 26a to cause the field within the generator 12a to decay, thereby reducing the output current. Indeed, it is envisaged that the terminals of the coils could be shorted together to result in the magnetic field collapsing quickly. In a further example, to be described in more detail below, the polarity of the control voltage may be reversed, resulting in the field coils being driven hard in the opposite direction, causing the magnetic flux to collapse even more quickly.

Figure 5A:
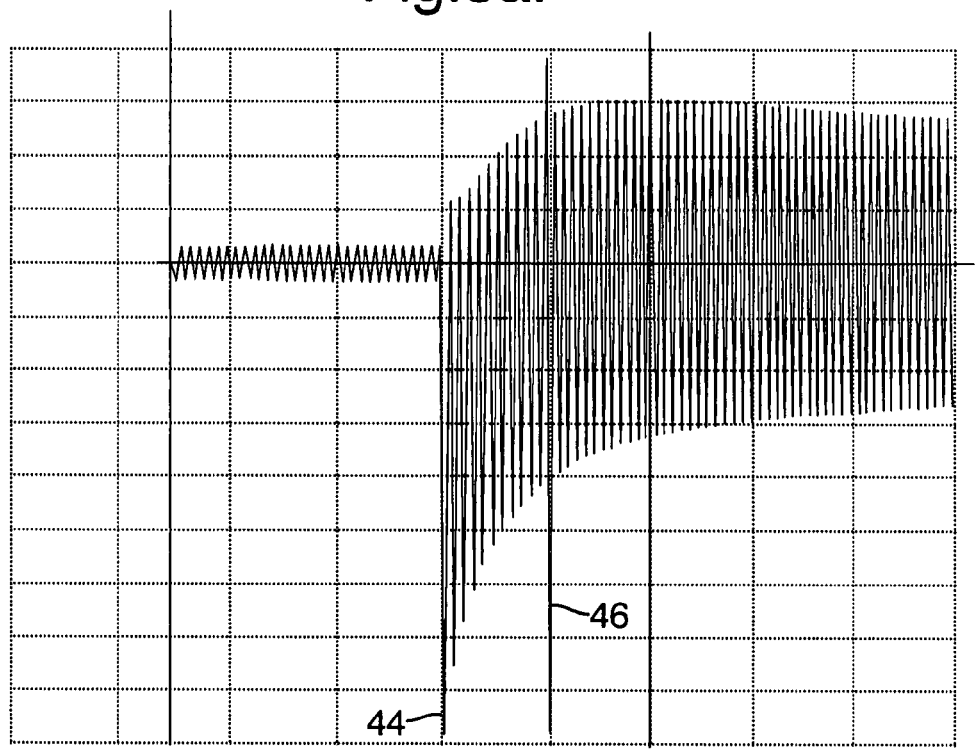
FIGS. 5a and 5b are plots of generator output current during fault conditions, respectively for a conventional arrangement and for an example embodiment of the present invention.
Figure 5B:
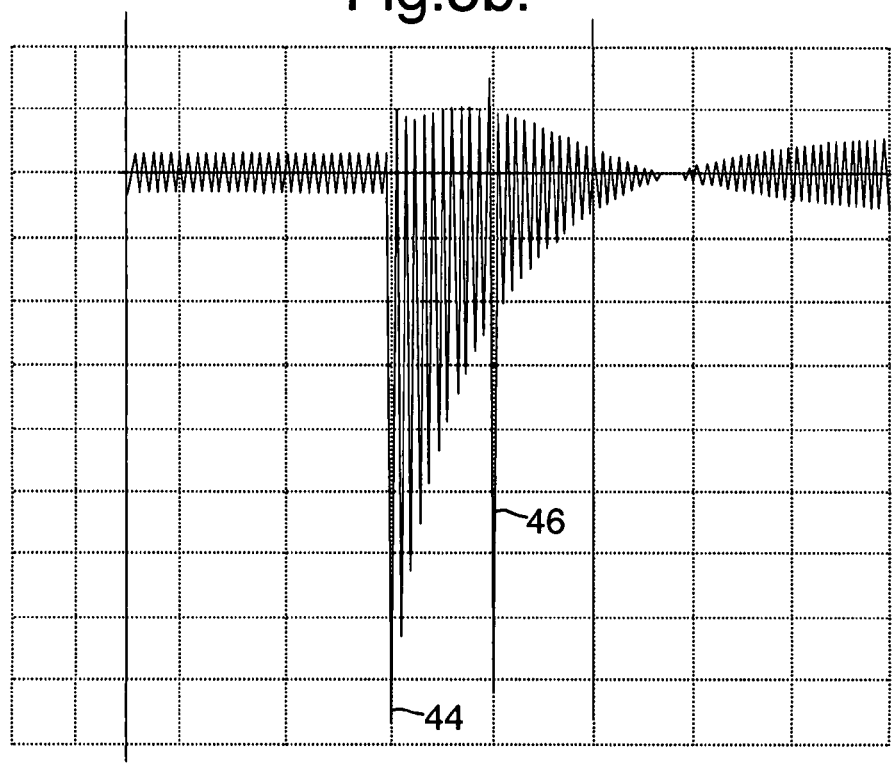

FIG. 5 illustrates the effect of reversing the polarity of the control voltage. FIGS. 5a and 5b are plots of the output current of a simulated generator which encounters the onset of fault conditions in the network, at the time 44 on the horizontal (time) axis. Prior to time 44, the generator is operating normally, in each case. FIG. 5a illustrates the response of a conventional generator, without the benefits of the present invention. At time 44, output current increases very significantly in amplitude and also has a substantial DC offset, which decays away by time 46, typically about 200 ms. Circuit breakers and other switchgear are conventionally designed to trigger after about 200 ms, partly to ensure that this DC offset has decayed. Nevertheless, it is readily apparent that the amplitude of the current to be borne by the switchgear 18 is much greater than the current in normal conditions, prior to time 44.

FIG. 5b uses the same simulator to simulate the effect of responding to the onset of fault conditions, in an example manner of the present invention. In the example of FIG. 5b, the simulator assumes that the polarity of the control voltage is reversed at the fault time 44, i.e. immediately in response to the onset of fault conditions. This reversal of the control voltage drives the field coil 26a to collapse the magnetic flux, resulting in the output current from the generator 12a decaying much more rapidly in FIG. 5b, than in FIG. 5a. Indeed, by the time 46 (about 200 ms after time 44) when switchgear 18a will operate, the current in the simulation of FIG. 5b has decayed to a level about half that achieved in the simulation of FIG. 5a, thus resulting in an improvement of approximately 2:1 in the fault current at the time of operation of the switchgear 18a.

FIG. 6 illustrates the equivalent circuit of an arrangement using a power electronic converter 48 for supplying field current to the field coil 26a and for responding to the onset of fault conditions.

Figure 6C:
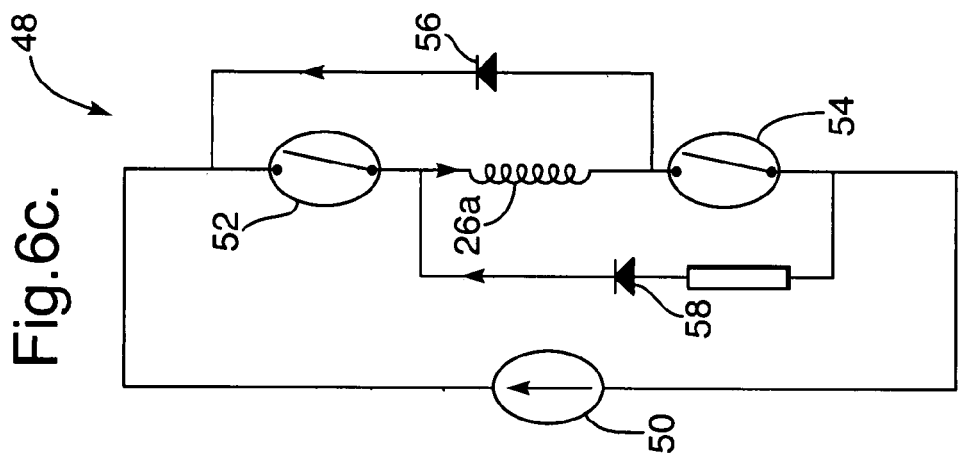
FIGS. 6a, b and c illustrate a power electronic converter for use in an example embodiment, and its manner of use.
Figure 6B:
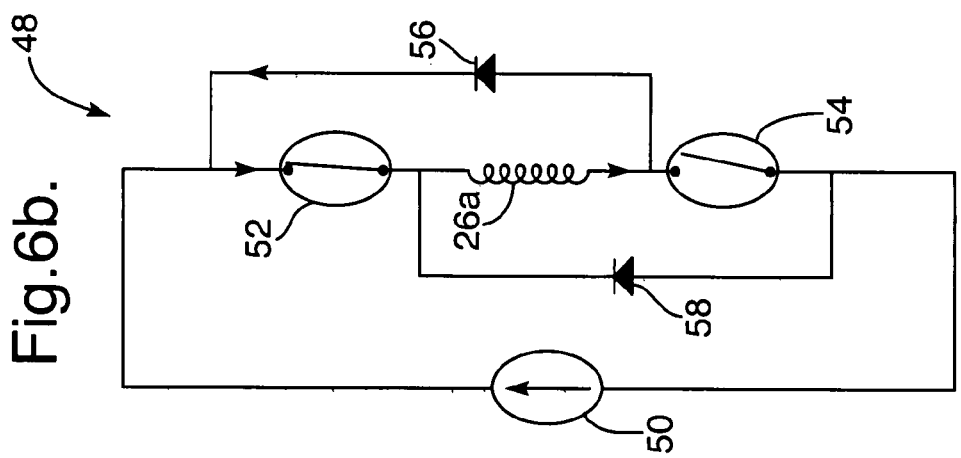
Figure 6A:
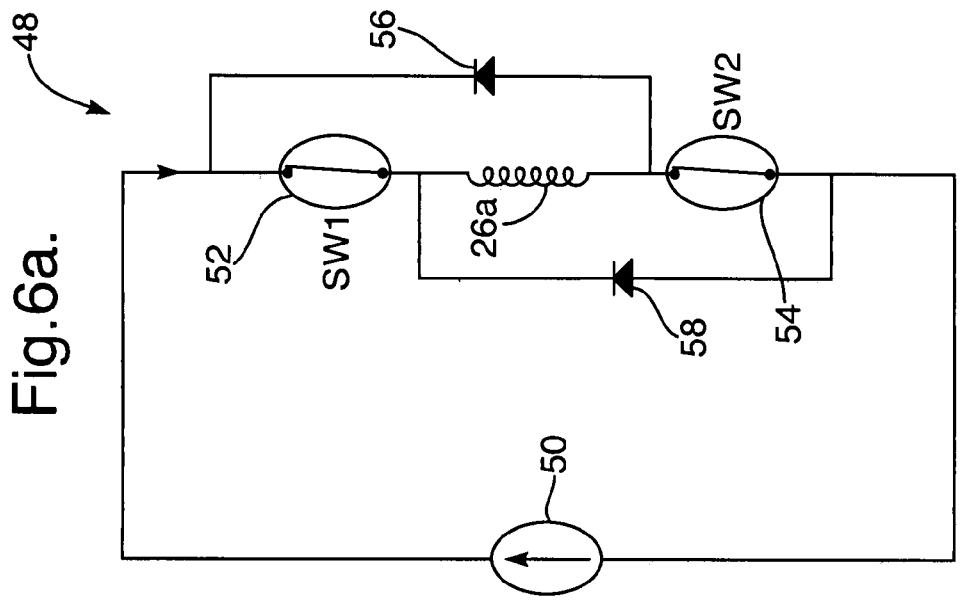

In FIG. 6a, a DC voltage source at 50 is provided by the field current supply 38. The DC voltage source 50 is connected in series through a first switch 52 to the coil 26a, and from the coil 26a through a second switch 54 to the DC voltage source 50. A first diode device 56 is connected from the supply side of the first switch 52, to the terminal of the coil 26a which is common with the second switch 54. The polarity of the device 56 prevents current flowing through the device 56 when both switches 52, 54 are closed, in the normal condition as illustrated in FIG. 6a.

A second diode device 58 is connected from the supply side of the second switch 54, to the terminal of the coil 26a which is common with the first switch 52. Again, the polarity of the device 58 is such that current cannot bypass the coil 26a when both switches 52, 54 are closed, as illustrated in FIG. 6a.

The provision of two switches 52, 54 provides the circuit of FIG. 6 with two alternatives for responding to the onset of fault conditions. In the first example, termed "soft discharge", illustrated in FIG. 6b, one of the switches (illustrated as the second switch 54) is opened, leaving the first switch 52 closed. This has the result of connecting the two ends of the coil 26a together, through the first diode device 56, allowing the coil current to decay, thereby decaying the magnetic flux within the machine and causing the output current to decay. This will result in a decay profile which is faster than that illustrated in FIG. 5a, but not so fast as that illustrated in FIG. 5b.

FIG. 6c illustrates an alternative possibility, in which both switches 52, 54 are opened. This results in the DC supply 50 being connected with reversed polarity to the coil 26a, through the diode devices 56, 58. Accordingly, rather than allowing a relatively soft decay of the magnetic flux, as in the example of FIG. 6b, the condition of FIG. 6c results in the magnetic flux being driven to collapse by virtue of the reversal of polarity, creating the fast decay illustrated in FIG. 5b. The choice of soft or fast decay may be made by the current limiting function 42, for example in response to the nature or severity of the fault.

Many variations and modifications can be made to the examples described above, without departing from the scope of the present invention. In other examples, the onset of fault conditions may be identified in a predictive manner, using a range of different monitored parameters and monitoring positions around the network. Alternative technologies could be used for implementing the control arrangements described, including hardware, software and combinations thereof.

We claim:

1. An electrical generator arrangement for an electrical power network, comprising:
   the electrical generator including a field coil arrangement which, in use, creates magnetic flux within the electrical generator arrangement;
   a field current supply means, operable, in use, to control the field current in the field coil arrangement;
   and a monitor means operable to monitor electrical power network conditions to detect the onset of a fault current;
   the field current supply means being responsive, in use, to the onset of a fault current to reduce the generated current to the electrical power network, by control of the field current, wherein said field current supply means is operable to reverse the polarity of the control voltage applied to the field coil arrangement.

2. An arrangement according to claim 1, wherein the field current supply means is responsive to the onset of fault current to reduce the magnitude of the field current.

3. An arrangement according to claim 1, wherein the field current supply means is operable to reduce the generated current by connecting together the terminals of the field coil arrangement, to cause the magnetic flux to decay.

4. An arrangement according to claim 3, wherein the field current supply means is operable to short together the terminals.

5. An arrangement according to claim 1, comprising a plurality of electrical generators connected at points around the electrical power network and switchgear provided at locations around the electrical power network to isolate a fault.

6. An arrangement according to claim 1, wherein the field current supply means includes a power electronic converter operable to control the field current.

7. An arrangement according to claim 6, wherein the power electronic converter includes a first diode device connected in parallel with the field coil, to be reversed biased relative to the field current, and first switch means operable to disconnect a common terminal of the field coil and the diode device, from the field current supply, whereby the common terminal is disconnected from the field current supply by opening the switch, allowing field current to re-circulate to the field coil, through the diode device.

8. An arrangement according to claim 6, wherein the power electronic converter includes first and second switch means connected between respective first and second terminals of the field coil arrangement, and respective sides of the field current supply means, and further include first and second diode devices connected, respectively, between the supply side of the first switch and the second terminal of the coil, and between the supply side of the second switch and the first terminal of the coil, whereby the control voltage applied to the field coil arrangement is reversed by opening both switch means.

9. An arrangement according to claim 1, wherein the monitor means is operable to detect the onset of a fault current by reference to electrical power network current, electrical power network voltage, electrical generator output current or electrical generator output voltage.

10. An arrangement according to claim 1, wherein the monitor means is operable to identify the onset of a fault current in a predictive manner.

11. An arrangement according to claim 1, wherein the monitor means detects the onset of fault current as a reduction in the voltage of the electrical power network, such as a reduction in said voltage beyond a threshold amount.

12. An arrangement according to claim 1, wherein the field current supply means operates, in use, in the absence of a fault current, to maintain the output voltage of the electrical generator arrangement.

13. A method of electrical generation for an electrical power network comprising an electrical generator arrangement, the electrical generator arrangement including a field coil arrangement, in which the field coil arrangement is used to create magnetic flux within the electrical generator arrangement, the method comprising monitoring the electrical power network conditions to detect the onset of a fault current, and the controlling field current in the field coil arrangement in response to the onset of a fault current to reduce the generated electrical current to the electrical power network, wherein the polarity of the control voltage applied to the field coil arrangement is reversed in response to the onset of a fault current.

14. A method according to claim 13, comprising reducing the field current in response to the onset of a fault current.

15. A method according to claim 13 comprising connecting the terminals of the field coil arrangement together to cause the field to decay, thereby reducing the magnitude of the field current.

16. A method according to claim 15, comprising shorting the terminals.

17. A method according to claim 13, wherein the electrical power network comprises a plurality of electrical generators connected thereto at a plurality of points around the electrical power network and switchgear provided at locations around the electrical power network to isolate a fault.

18. A method according to claim 13 comprising identifying the onset of fault conditions with reference to electrical power network current, electrical power network voltage or in a predictive manner.

19. A method according to claim 13 comprising detecting the onset of a fault current as a reduction in electrical power network voltage.

20. A method according to claim 19, comprising detecting the onset of a fault current as a reduction by more than a threshold amount.

21. An electrical power network comprising a plurality of electrical generators connected at appropriate points around the electrical power network, switchgear provided at various locations around the electrical power network to isolate a fault, each electrical generator including a field coil arrangement which, in use, creates magnetic flux within the electrical generator, each electrical generator including a field current supply means, operable, in use, to control the field current in the field coil arrangement, at least one of the electrical generators having a monitor means operable to monitor the electrical power network conditions to detect the onset of a fault current, the field current supply means being responsive, in use, to the onset of a fault current to reduce the generated current to the electrical power network, by control of the field current, wherein the field current supply means is operable to reverse the polarity of the control voltage applied to the field coil arrangement.

22. A method of electrical generation for an electrical power network comprising a plurality of electrical generators connected at appropriate points around the electrical power network, switchgear provided at various locations around the electrical power network to isolate a fault, each electrical generator including a field coil arrangement which is used to create magnetic flux within the electrical generator arrangement, the method comprising monitoring the electrical power network conditions to detect the onset of a fault current, controlling the field current in the field coil arrangement of at least one of the electrical power network, including reversing the plurality of the control voltage applied to the field coil arrangement.

23. An electrical generator arrangement for an electrical power network, comprising:
the electrical generator including a field coil arrangement which, in use, creates magnetic flux within the electrical generator arrangement;
a field current supply means, operable, in use, to control the field current in the field coil arrangement;
and a monitor means operable to monitor electrical power network conditions to detect the onset of a fault current;
the field current supply means being responsive, in use, to the onset of a fault current to reduce the generated current to the electrical power network, by control of the field current wherein the field current supply means includes a power electronic converter operable to control the field current, and wherein the power electronic converter includes a first diode device connected in parallel with the field coil, to be reversed biased relative to the field current, and first switch means operable to disconnect a common terminal of the field coil and the diode device, from the field current supply, whereby the common terminal is disconnected from the field current supply by opening the switch, allowing field current to re-circulate to the field coil, through the diode device.

24. An electrical generator arrangement for an electrical power network, comprising:
the electrical generator including a field coil arrangement which, in use, creates magnetic flux within the electrical generator arrangement;
a field current supply means, operable, in use, to control the field current in the field coil arrangement;
and a monitor means operable to monitor electrical power network conditions to detect the onset of a fault current;
the field current supply means being responsive, in use, to the onset of a fault current to reduce the generated current to the electrical power network, by control of the field current wherein the field current supply means includes a power electronic converter operable to control the field current, and wherein the power electronic converter includes first and second switch means connected between respective first and second terminals of the field coil arrangement, and respective sides of the field current supply means, and further include first and second diode devices connected, respectively, between the supply side of the first switch and the second terminal of the coil, and between the supply side of the second switch and the first terminal of the coil, whereby the control voltage applied to the field coil arrangement is reversed by opening both switch means.

* * * * *